United States Patent [19]

Bernays, Jr.

[11] Patent Number: 4,924,812
[45] Date of Patent: May 15, 1990

[54] WATER BOWL FOUNTAIN

[76] Inventor: Robert L. Bernays, Jr., 7815 Yamini, Dallas, Tex. 75230

[21] Appl. No.: 305,393

[22] Filed: Feb. 1, 1989

[51] Int. Cl.⁵ .................................. A01K 7/06
[52] U.S. Cl. .................................. 119/76
[58] Field of Search .................................. 119/75, 76

[56] References Cited

U.S. PATENT DOCUMENTS

| | | | |
|---|---|---|---|
| 33,243 | 9/1961 | Fraer | 119/76 |
| 36,203 | 8/1862 | Black et al. | 119/76 |
| 79,146 | 6/1868 | Russell | 119/76 |
| 259,414 | 6/1882 | Moore . | |
| 434,072 | 8/1890 | Quigley | 119/76 |
| 435,570 | 9/1890 | Stone | 119/76 |
| 624,176 | 5/1899 | Chisholm | 119/76 |
| 1,176,214 | 3/1916 | Graham | 119/76 |
| 1,212,537 | 1/1917 | Millen | 119/76 |
| 1,278,285 | 9/1918 | Allen | 119/76 |
| 1,894,563 | 1/1933 | Jones . | |
| 2,541,369 | 2/1951 | Kofford | 119/75 |
| 2,878,781 | 3/1959 | Wingfield | 119/72 |
| 3,179,085 | 4/1965 | McKillip, Jr. | 119/75 |
| 3,272,181 | 9/1966 | Ramsey | 119/76 |
| 3,777,714 | 12/1973 | Danielsson | 119/75 |
| 4,117,555 | 7/1977 | Dennis | 119/75 |
| 4,370,948 | 2/1983 | Atkins | 119/75 |
| 4,469,049 | 9/1984 | Waynick | 119/76 |
| 4,573,433 | 3/1986 | Thompson | 119/75 |

Primary Examiner—Paul J. Hirsch
Attorney, Agent, or Firm—Richards, Medlock & Andrews

[57] ABSTRACT

A water bowl fountain device (2) for supplying pets with a fresh source of running water. A platform (4) positioned above a pressure activated valve (32) whereby forces applied to platform (4) activate pressure activated valve (32). Water flows from pressure activated valve (32) through a flow tube (44) which is connected to a rigid tube (46) which extends through a hole (48) in platform (4). Rigid tube (46) directs water into a bowl (50) attached to platform (4), said bowl (50) having a bottom (51) having a hole (53) located over a drainage bore (52) whereby water entering bowl (50) is drained away from said device through drain hose (60).

4 Claims, 1 Drawing Sheet

WATER BOWL FOUNTAIN

TECHNICAL FIELD

This invention relates to self-actuated devices which provide a fresh source of water to animals.

BACKGROUND OF THE INVENTION

All living organisms require water for survival. Generally, household pets obtain water from a bowl of standing water provided by the pet owner. However, a bowl of water which is exposed to the ambient air is subject to evaporation, contamination and even stagnation, leaving the pet, i.e. dog or cat, without an available water supply. Additionally, a standing water supply may be located in a yard; where the water supply will absorb heat thereby negating the water's cooling effect to the pet. The above is premised on the water bowl containing water. There may be instances when the water bowl is not filled by the pet owner, such as an emergency, travel or other circumstances.

Therefore, a device to supply water is needed that will provide a fresh, clean, cool water supply to pets. Further, said device must be pet-actuatable so that the pet may access water when needed, minimizing waste.

SUMMARY OF THE INVENTION

The present invention generally incorporates a springloaded platform located above a pressure activated valve. Said valve is connected to a pressurized water supply, such as a water spigot. Pressure is applied to the platform which activates the valve, water flows through a pipe extending through the platform. Said water is directed in a fountain-like manner into a bowl located on top of the platform. As the fountain of water arches above the bowl, the pet may drink. As the water enters the bowl it is drained from the bowl through a drain located in the bottom of the bowl which extends through the platform and drains the water away from the device. Drainage of the bowl allows the pet to access a fresh, clean, cool supply of running water. The drain may be positioned above the bottom of the bowl at a predetermined height so that water may be captured in the bowl at a predetermined level.

BRIEF DESCRIPTION OF THE DRAWINGS

A better and more complete understanding of the present invention and advantages thereof will be gained from the Detailed Description, claims and accompanying drawings, in which:

DETAILED DESCRIPTION

Figure 1:
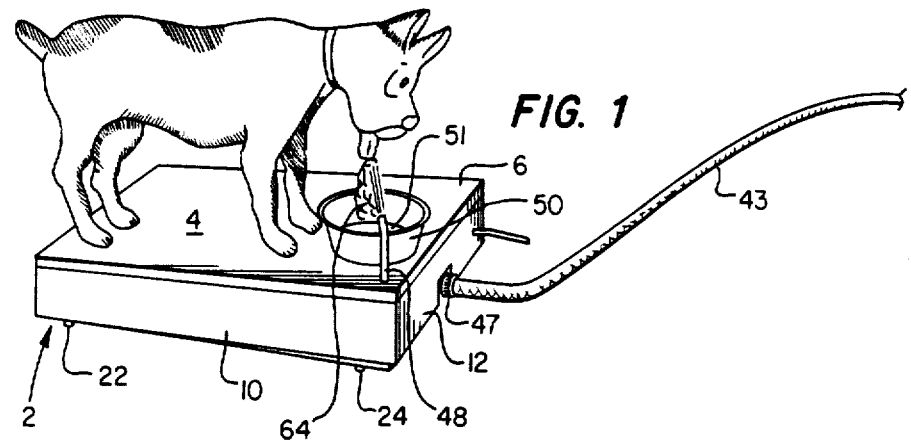
FIG. 1 is an illustrative view of the present invention in operation.
Figure 2:
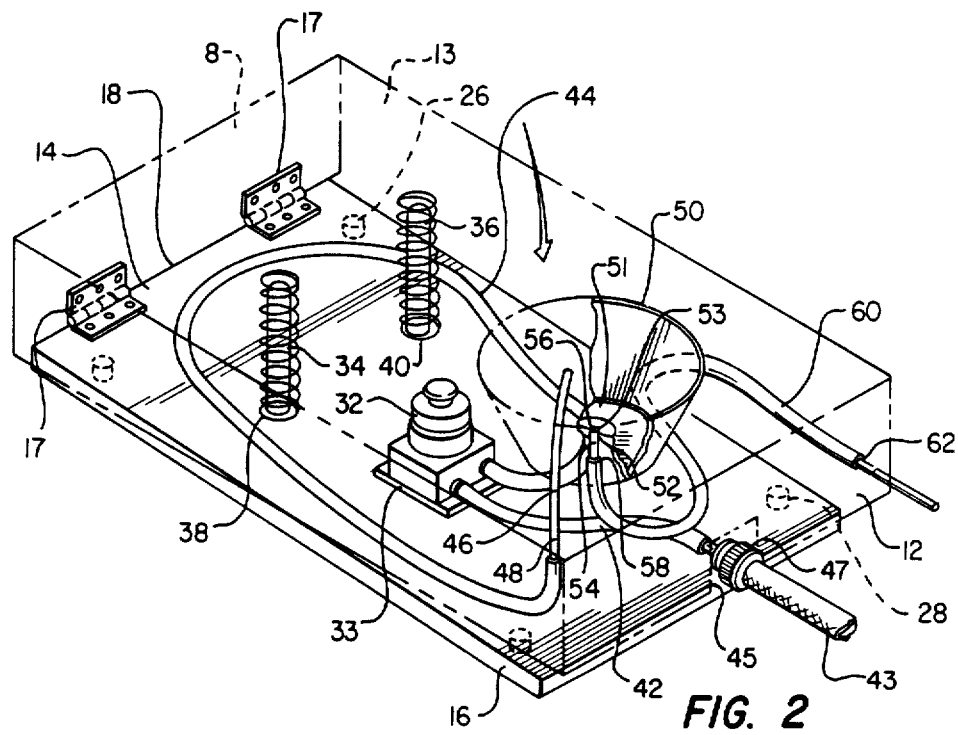
FIG. 2 is a perspective view of the present invention.

A water bowl fountain is shown in FIGS. 1 and 2 and generally referenced as device 2. Device 2 generally incorporates a platform 4. Platform 4 comprises a top 6 and four sides 8, 10, 12 and 13, forming a cavity 14. Platform 4 is rectangular in shape, however any shape is adequate as long as a pet, such as a dog or cat, has an adequate area on which to apply weight. Further, platform 4 should have a sufficient area so that the pet is encouraged to stand on platform 4 to access the water supply.

Platform 4 may be made of a material such as wood. However, to minimize corrosion, a material such as plastic, plexiglas, fiberglass or non-corrosive metal may be used.

Platform 4 is attached to a base 16. Attachment is accomplished through hinges 17, joining side 8 with end 18 of base 16. Attachment of side 8 and base 16 through hinge 17 is accomplished by fasteners such as screws, nails or other suitable means. However, it will be understood that the means to connect platform 4 to base 16 is not limited to hinge 17. The purpose of hinge 17 is to maintain platform 4 relative to base 16 while allowing some movement of platform 4. The purpose being to allow sufficient movement whereby platform 4 activates device 2 as force is applied thereto, and device 2 deactivates when said force is removed.

Attached to the bottom 20 of base 16 are legs 22, 24, 26 and 28, which act to maintain the position of device 2 above the ground and away from its corrosive effects. Attachment of legs 22, 24, 26 and 28 to base 16 is accomplished by fasteners such as screws, nails or other suitable means.

Attached to a top 30 of base 16 is a pressure activated valve 32, and dowels 34 and 36. Pressure activated valve 32 is attached to base 16 by hold down 33 or suitable fasteners.

Attached to pressure activated valve 32 is a hose 42 which contains and directs a pressurized water supply. Hose 42 may be connected to a standard garden hose 43 connected to a standard water spigot located on the exterior of a house. Hose 42 connects to garden hose 43 through notch 45 located in side 12 of platform 4. Adapter 47 connects garden hose 43 with hose 42. Also connected to pressure activated valve 32 is a flow tube 44 which extends and connects to a rigid tube 46. Rigid tube 46 extends through a hole 48 in top 6 of platform 4. Hole 48 is located proximate to a bowl 50 which is attached to top 6 of platform 4 by an adhesive or fasteners or both.

Extending through top 6 of platform 4 is drainage bore 52. Positioned in drainage bore 52 is an extension tube 54, having a slight interference fit with drainage bore 52. The interference fit between bore 52 and extension tube 54 allows extension tube 54 to be slidably positioned relative to platform 4. Bowl 50 having a bottom 51 having a hole 53 therethrough is located over drainage bore 52 aligning hole 53 therewith. The end 56 of extension tube 54 may be raised or lowered in relation to bottom 51 of bowl 50 thereby regulating the level of water which may be maintained in bowl 50. End 58 of extension tube 54 is attached to a drain hose 60 which extends through a drain hose bore 62 located in side 12 of platform 4, away from device 2.

Located on dowels 34 and 36 are springs 38 and 40. Dowels 34 and 36 have a predetermined length, and springs 38 and 40 have such a spring rate as to maintain platform 4 above pressure activated valve 32 when device 2 is not in use. When a sufficient force is applied to top 6 of the platform 4, springs 38 and 40 are compressed, pressure is applied to pressure activated valve 32, opening said valve thereby allowing water to flow through flow tube 44 and rigid tube 46 forming an arch of water 64 into bowl 50. Water 64 drains from bowl 50 through extension 54 and drain hose 60, away from device 2.

To activate device 2 a dog or other pet desiring water may step on platform 4 compressing springs 38 and 40. Platform 4 contacts pressure activated valve 32 activating such. Water flows through flow tube 44 and rigid tube 46 forming arc of water 64 into bowl 50. The pet may drink as desired. Water flowing into bowl 50 is subsequently drained away from device 2 through drain hose 60.

Although one embodiment of the present invention has been illustrated in the accompanying drawings and described in the foregoing Detailed Description, it will be understood that the invention is not limited to the embodiments disclosed, but is capable of numerous rearrangements, modifications and substitutions without departing from the scope of the invention.

I claim:

1. An animal watering device connected to a pressurized water supply, comprising:
   a rectangular platform having a top having four corners and three sides forming a cavity, and a first and second bore extending through said top proximate to one corner, said platform sized to accommodate the weight of a dog;
   a rectangular base having a top and a bottom having four legs attached thereto;
   a pressure activated valve connected to said water supply;
   fasteners for connecting said pressure activated valve to the top of said base;
   a hinge for pivotally attaching said base to said platform;
   at least one spring positioned between said platform and said base so that said platform is maintained above said pressure activated valve whereby force applied to the top of said platform will compress said spring, thereby activating said pressure activated valve;
   a bowl having a bottom having a hole therethrough, positioned on the top of said platform over said second bore aligning said hole and said second bore;
   a flow tube having a rigid first end, connected to said pressure activated valve said first end extending through the first bore of said platform proximate to said bowl so that water flowing through said flow tube is directed into said bowl;
   a drainage hose having a first and second end, said first end slidably mounted in said second bore whereby the location of said first end may be regulated in relation to the bottom of said bowl thereby determining the amount of water captured in said bowl before draining, said second end extending away from said device.

2. An animal watering device connected to a pressurized water supply, comprising:
   a platform having a top and sides forming a cavity, and a first and second bore extending through said top;
   a base having a top and a bottom;
   a pressure activated valve connected to said water supply;
   fasteners for connecting said pressure activated valve to the top of said base;
   a means for pivotally attaching said base to said platform;
   at least one spring positioned between said platform and said base so that said platform is maintained above said pressure activated valve whereby force applied to the top of said platform will compress said spring, thereby activating said pressure activated valve;
   a bowl having a bottom having a hole therethrough, positioned on the top of said platform over said second bore aligning said hole and said second bore;
   a flow tube connected to said pressure activated valve said first end extending through the first bore of said platform proximate to said bowl so that water flowing through said flow tube is directed into said bowl;
   a drainage hose having a first and second end, said first end slidably mounted in said second bore whereby the location of said first end may be regulated in relation to the bottom of said bowl thereby determining the amount of water captured in said bowl before draining, said second end extending away from said device.

3. An animal watering device connected to a pressurized water supply, comprising:
   a platform having a top and sides forming a cavity, and a first and second bore extending through said top proximate to the side;
   a base having a top and a bottom;
   a pressure activated valve connected to said water supply;
   means for connecting said pressure activated valve to the top of said base;
   a means for pivotally attaching said base to said platform;
   a means for resiliently positioning said platform above said base whereby force applied to the top of said platform will compress said resilient means, thereby activating said pressure activated valve;
   a bowl having a bottom having a hole therethrough, positioned on the top of said platform over said second bore aligning said hole and said second bore;
   a means for directing said water from said pressure activated valve into said bowl whereby said water is cooled by the ambient air;
   a drainage hose having a first and second end, said first end slidably mounted in said second bore whereby the location of said first end may be regulated in relation to the bottom of said bowl thereby determining the amount of water captured in said bowl before draining, said second end extending away from said device.

4. An animal watering device connected to a pressurized water supply, comprising:
   a platform having a top and sides forming a cavity, and a bore extending through said top proximate to the side;
   a base having a top and a bottom;
   a pressure activated valve connected to said water supply;
   means for connecting said pressure activated valve to the top of said base;
   a means for pivotally attaching said base to said platform;
   a mean for resiliently positioning said platform above said base whereby force applied to the top of said platform will compress said resilient means, thereby activating said pressure activated valve;
   a means for directing said water from said pressure activated valve through the bore in the platform, forming a stream of water from which the animal may drink.

* * * * *